Aug. 17, 1954 S. I. MacDUFF 2,686,677

RECORD SUPPORTING AND RELEASING MECHANISM FOR AUTOMATIC PHONOGRAPHS

Filed Aug. 24, 1948 3 Sheets-Sheet 1

INVENTOR.
STANLEY I. MACDUFF
BY Cecil D. Arens
ATTORNEY

INVENTOR.
STANLEY I. MAC DUFF
BY Cecil J. Arens
ATTORNEY

Aug. 17, 1954 S. I. MacDUFF 2,686,677

RECORD SUPPORTING AND RELEASING MECHANISM FOR AUTOMATIC PHONOGRAPHS

Filed Aug. 24, 1948 3 Sheets-Sheet 3

INVENTOR.
STANLEY I. MACDUFF
BY
Cecil J. Arens
ATTORNEY

Patented Aug. 17, 1954

2,686,677

UNITED STATES PATENT OFFICE 2,686,677

RECORD SUPPORTING AND RELEASING MECHANISM FOR AUTOMATIC PHONOGRAPHS

Stanley I. MacDuff, South Bend, Ind., assignor to Bendix Aviation Corporation, South Bend, Ind., a corporation of Delaware Application August 24, 1948, Serial No. 45,884

7 Claims. (Cl. 274—10)

This invention relates to automatic phonographs for playing a plurality of records, one after the other, without manual interference.

The mechanism of the invention is primarily used in association with record changers of a type wherein a record is deposited by gravity in a magazine beneath the turntable after reproduction of the record. This method of storing used records has the advantage of conserving space in much the same manner as where the played records are stacked on the turntable one on top of the other without the disadvantages incident to the latter method of storage, such for example, as the objectionable feature of increasing the load on the turntable motor as the records are deposited on the turntable to be played, which tends to vary the speed of the turntable. The subject matter of this application is disclosed but not claimed in my application Serial No. 35,166, filed June 25, 1948, relating to a Record Changer.

An object of the invention resides in the provision of a mechanism having two record supporting members carried at different levels so that the upper member releasably holds a stack of records for dropping one at a time to the lower member from which the record is subsequently dropped for deposit on the turntable.

Another object of the invention resides in the provision of a record supporting and slicing mechanism having first supporting members formed with tapered edges for sliding between records in a stack and on which a stack of records is normally carried and second supporting members located on a level below said first supporting members and to which said stack is shifted for temporary support when said first supporting members have been rotated out from under said stack, and after which said first supporting members are rotated back into said stack between the lowermost record and said stack to thereby free a record for deposit on said turntable.

The above and other objects and features of the invention will be apparent from the following description of the apparatus taken in connection with the accompanying drawings which form a part of this specification, and in which.

Figure 3:
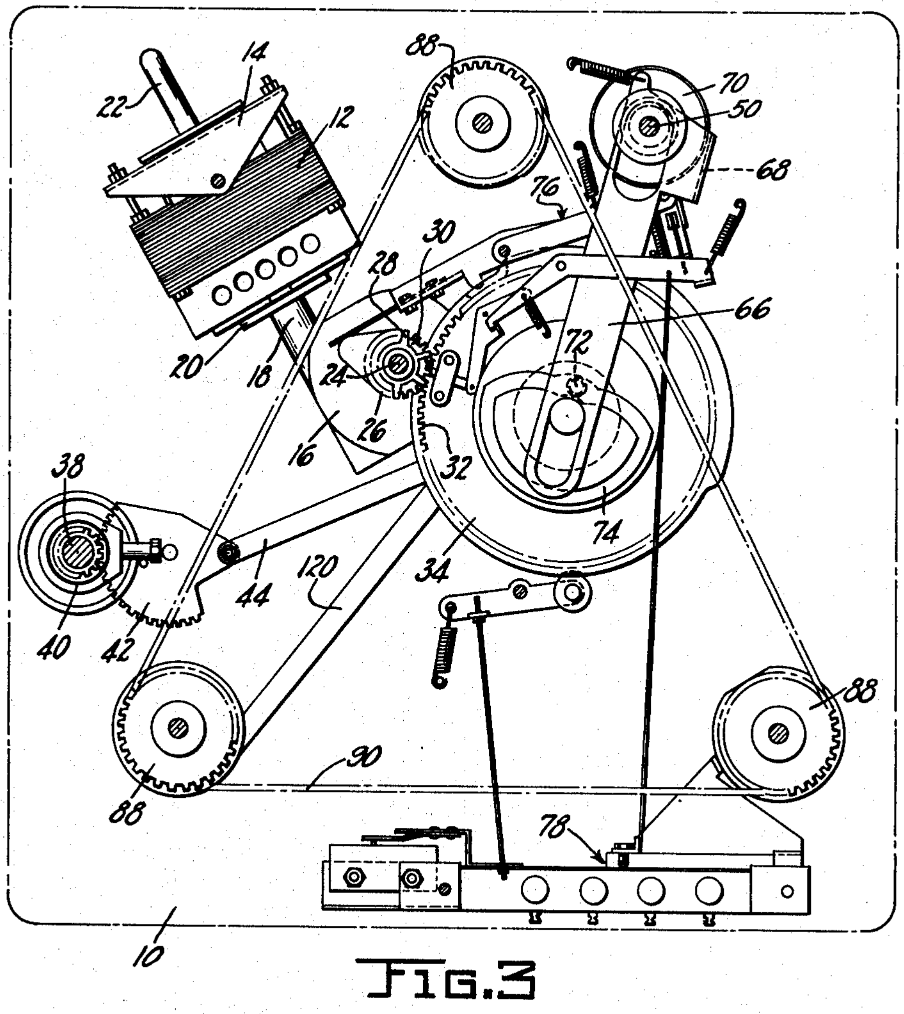
Figure 3 is a view taken on the lines 3—3 of Figure 2, when the apparatus is rotated to the position of Figure 1.

Referring now to Figure 3 of the drawings the reference numeral 10 designates a platform which may be supported in any suitable manner on vibration damping mountings, such as springs, not shown. An electrical motor 12 is carried on the underside of the platform by a bracket 14. A gear box 16 is formed with an integral tubular extension 18 having a flange 20 at its outer end for fastening the gear box to the motor. The motor 12 is provided with a shaft 22 having an end extending through the tubular extension 18 into the gear box 16. A vertically extending shaft 24 has one end terminating in the gear box, where the shaft is drivably connected through gearing, not shown, to the motor shaft 22. A pinion gear 26 is fixed to the other end of shaft 24. The pinion gear 26, which is rotated continuously when the phonograph apparatus is being played, is provided with interrupted gear teeth 28 and continuous gear teeth 30, for engagement with teeth 32 of a cam element 34.

A record supporting mechanism or turntable 36, for supporting a record from a stack of records 37, is swingably mounted on the upper end of a shaft 38, to the lower end of which a gear 40 is fixed for driving engagement with a gear sector 42. A lever 44 connects the gear sector 42 to the circular cam element 34.

A tone arm 46, having a pickup 48 articulated thereto, is mounted on a vertical shaft 50 supported in a hub 52 integral with the platform 10. The pickup or reproducer 48 is carried in gimbals 54 of the tone arm and is of a common form except that it is equipped with a double pointed needle 56 arranged to engage in the grooves in either the top or the bottom side of a record which is supported on the turntable 36. The lower end of the vertical shaft 50 is rounded at 58 so as to offer a minimum of friction to its sliding contact with an arm 60, of a bell crank 62, which raises and lowers the tone arm to the desired position above or below a record, as the case may be. An arm 64 of the bell crank is disposed at right angles to the arm 60 and is provided with a roller, not shown, arranged for rolling contact with inner and outer cam tracks, not shown, of the cam 34. When the cam revolves the roller is positioned in one or the other of the cam tracks depending on whether the top or bottom side of a record is to be played. The tone arm is connected to the cam for lateral movement through a reciprocating lever 66, provided with a flange 68, constituted to ride on the periphery of a wheel 70 drivably associated with the tone arm. The end of the reciprocating lever opposite the flange 68 is equipped with a cam follower 72 which rides in a cam track 74 of the cam 34. A tripping mechanism 76 automatically controls the cycling of the apparatus. A control 78 is connected to the tripping mechanism for manually controlling cycling of the phonograph.

Figure 1:
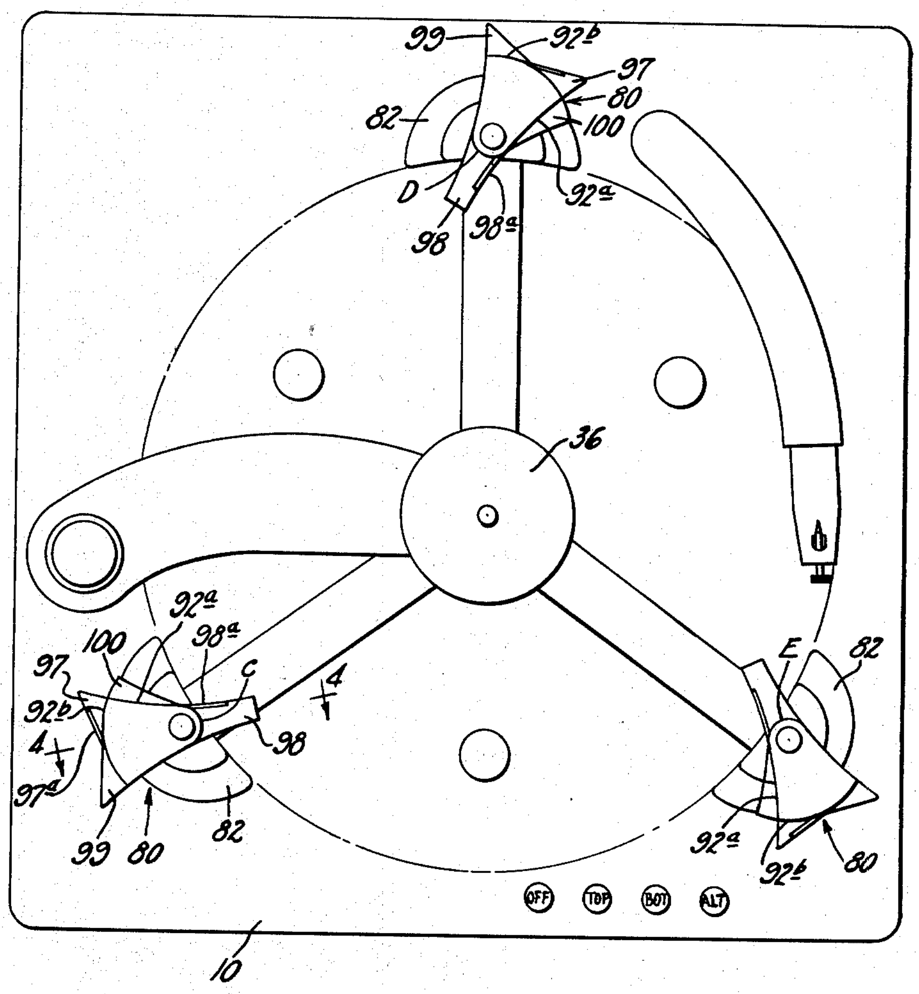
Figure 1 is a top plan view of a phonograph apparatus incorporating the device of the invention.

The invention herein resides in the means for releasably supporting a stack of records above the turntable and comprises a set of three record slicers and supports 80 rotatably carried in posts 82 integral with the top side of the platform and spaced approximately 120° apart around the periphery of the record circle, see Figure 1. Since the construction of the record slicers and supports 80 is identical for all three only one will be described in detail, see Figures 4, 5, and 6. The post 82 provides a main bearing for a sleeve 84, to the upper end of which a record support member 86 is press fitted. The record support member 86 rides on the flat surface 87 of the post. A sprocket 88 is securely fastened to the lower end of the sleeve 84. A continuous chain 90 passes over the sprockets of the three slicers so that rotation of one slicer rotates all three slicers. A slicer member 92 is mounted axially in line and above the record support 86 for limited rotational movement relative thereto. A stub sleeve 93 is press fitted into a bore 94 of the slicer member 92. The stub sleeve 93 is axially aligned with sleeve 84 and is provided with an extension 95 which rotatably fits into a bore 96 of the record support member 86. This extension 95 of the stub sleeve acts as a pilot or pivotal guide for the slicer member.

The slicer member 92 is provided with blades or fingers 97 and 98 for supporting respectively stacks of 10 and 12 inch records. These blades also function as slicers for separating the lowermost record from a stack. The support member 86 is formed with upper blades or fingers 99 and 100 for carrying respectively a stack of 10 and 12 inch records during the slicing operation, and fingers 101 and 102 for carrying respectively a 10 or 12 inch record which has been dropped from the stack. The fingers 98 and 100 which support and slice the 12 inch records from a stack of 12 inch records and the fingers 97 and 99 which support and slice the 10 inch records from a stack of 10 inch records are respectively spaced apart vertically a distance equal to the minimum thickness of standard records, see Figure 2. The distances between these fingers are designated by the letters *a* and *b* respectively for 10 and 12 inch records. The fingers or blades 97 and 98 have respectively relatively sharp edges 97*a* and 98*a* which facilitates movement of the fingers between the lowermost record of a stack and the stack. As best shown in Figure 1 the sides of members 86 and 92 are formed to guide a record, a 12 inch record in this case, from the stack to the lowermost finger 102. That is, the sides provide a three point contact at C, D, and E. This contact is also maintained as the slicers rotate since sides 86*a* and 92*a* are formed with radii that will keep the distance from the three points C, D, and E to the center of the record circle constant. The sides 86*b* and 92*b* are formed with radii that will likewise keep the distance from the contact points to the center of the record circle constant when a 10 inch record is played.

With reference to Figure 1, it will be observed that the finger 100 of the support member 86 is located laterally out from under the stack of records which are being supported on the finger 98 of the slicer member 92. Also with reference to Figure 2, it will be noted that the finger 102 is located below the finger 98.

In order to compensate for variance in record thickness the slicer member 92 and the support member 86 are formed with complementary cam surfaces 105 and 106 which permits increasing the vertical distances between fingers 98 and 100, for example, when a record having a thickness somewhat greater than the allowed minimum thickness is encountered. The cams 105 and 106, of the two members 86 and 92, are held in driving relationship by a spring 107 interposed between head 108, which is located at one end of a rod 109, and the member 92. The rod 109 passes freely through the sleeve 84 and is threaded at its other end to receive a nut 110 which is drawn up tightly against the end of sleeve 84 to thereby preload spring 107. If a relatively thick record is encountered the cam surface 105 slides along cam surface 106 to thereby raise member 92 against spring 107.

Figures 2, 4, 5:
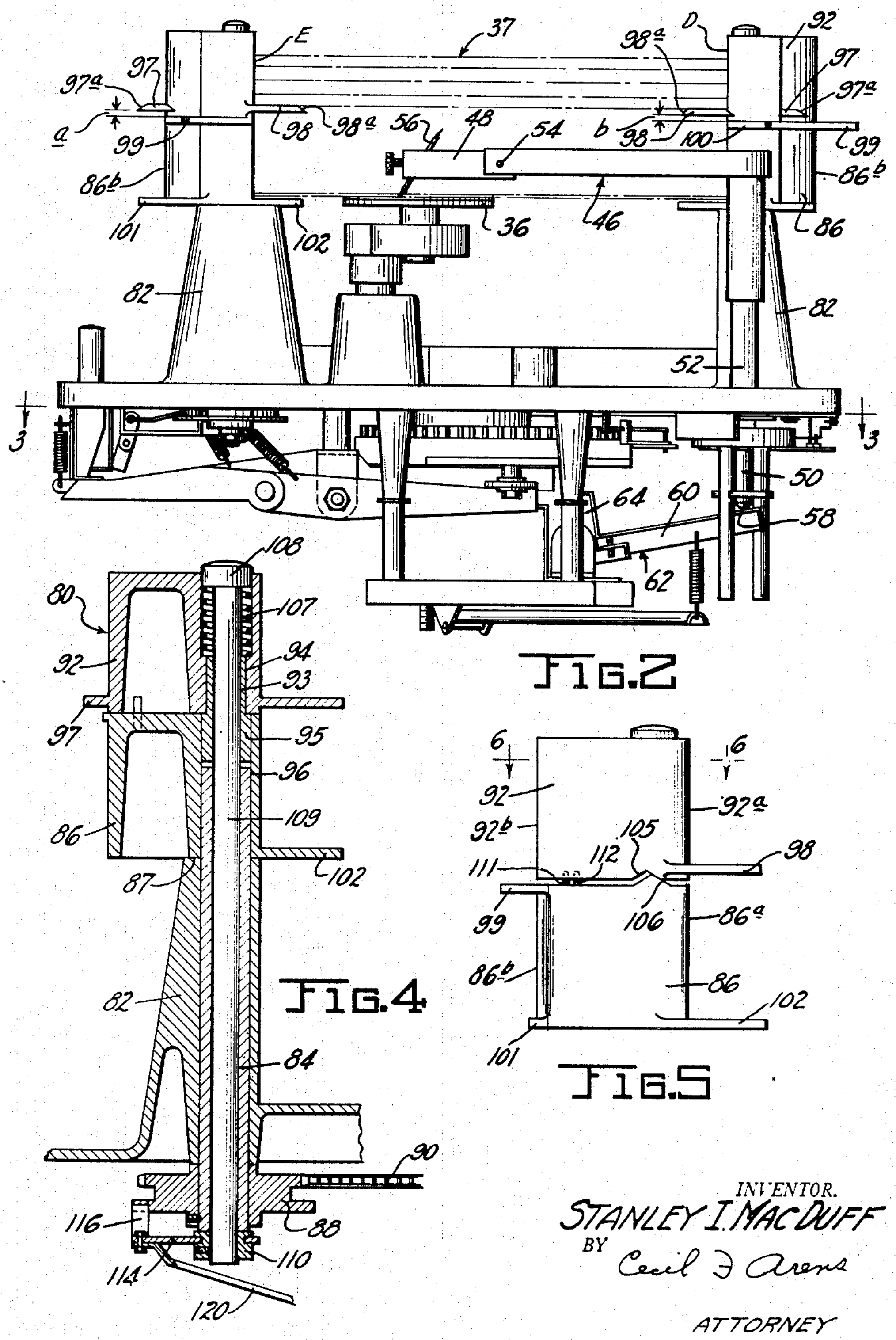
Figure 2 is a view in elevation of the right side of the apparatus of Figure 1, with parts omitted for clarity.
Figure 4 is a view in vertical section taken on the lines 4—4 of Figure 1 of the record supporting and releasing means.
Figure 5 is a view in side elevation showing the construction of the slicing means used to compensate for variance in record thickness.
Figure 6:
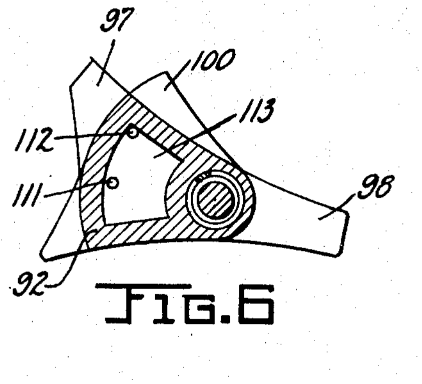
Figure 6 is a sectional view taken on the lines 6—6 of Figure 5.

As shown in Figures 4, 5, and 6 to limit the relative rotational movement between members 86 and 92 in one direction only, which movement is necessary for the required action of the cams 105 and 106, pins 111 and 112 are carried on the top side of member 86 so as to extend into the hollow portion 113 of member 92 to thereby engage the walls thereof. Pin 111 is positioned so that member 92 can be rotated in a clockwise direction a given amount with respect to member 86 before the pin will engage the side wall of the former member. Pin 112 is positioned to normally engage the inside wall of member 92 so that counterclockwise rotation of the said member is prevented when blade 98 is being withdrawn from beneath a stack of records.

Figure 7:
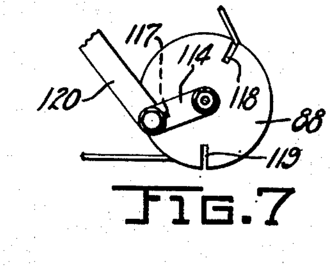
Figure 7 is a view of the detent arrangement for selectively setting the slicers for 10 inch or 12 inch records.

A crank or lever 114 is carried by the lower end of one only of rods 109 to provide a drive between the nut 110 and the sleeve, and is releasably engageable with the sprocket 88 through the employment of a detent 116 carried by the upper side of the crank. The sprocket is slotted at 117, 118, and 119, see Figure 7, to receive the detent 116. When the detent is in registry with any one of the slots the spring 107 will pull the detent into engagement with that slot, so that rotation of the crank 114 will impart rotation to the sprocket and hence actuate the slicers. A lever 120 connects the crank 114 to the lever 44 which in turn has one end drivably connected to the cam 34. Hence any rotation imparted to the cam will simultaneously operate the slicers and swing the turntable laterally in timed relationship. To disengage the detent 116 from the slot, button 108 is pushed downwardly against spring 107. The slicers can now be rotated by hand to any desired setting of the arrow, see slicer on left, Figure 1, depending on the size of the record to be played. The rod 109 which carries the crank 114 is provided with a head or button having the indicia M, 12, and 10 thereon which denotes respectively a setting of the slicers for manual operation or the automatic playing of 12 inch records, and 10 inch records. Figure 1 shows the position of the slicers for handling 12 inch records.

After a record has been played the slicer mechanism and turntable are automatically set in operation through the action of the trip mechanism aforementioned, which forms no part of the present invention, but which is described and claimed in the application of Farlow B. Burt, Serial No. 39,030, filed July 16, 1948. The initial action of the turntable and slicers are concurrent. Let us assume that a stack of 12 inch records rest on blades 98, and the turntable carries a record of like size which has just finished playing. At first, the turntable is lowered, depositing the played record on the fingers 102; the turntable is then swung laterally outside the record circle and the slicers rotated so that the played record which was deposited on the fingers 102 will now be dropped into the record receiving means on the platform therebelow. At the same time that the played record is being dropped from the fingers 102, it will be noted that fingers 98 have rotated out from under the stack of records 37 which is now supported temporarily on fingers 100 which have rotated under the stack before fingers 98 had completely withdrawn. It will be remembered that fingers 100 are at a lower level than fingers 98. After having shifted the stack from fingers 98 to 100 the slicers now reverse, roating fingers 98 between the lowermost record in the stack and the stack. As fingers 98 rotate back under the stack fingers 100 rotate out from under the stack. This action slices the lowermost record from the stack and drops the same onto fingers 102 which were rotated with fingers 98 and are located directly therebelow. The turntable movement is timed to the slicer action so that the turntable is swung back under the stack and elevated into playing position concurrently with the reverse rotation of fingers 98.

Although this invention has been described in connection with certain specific embodiments, the principles are susceptible of numerous other applications that will readily occur to persons skilled in the art.

Having thus described the various features of the invention, what I claim as new and desire to secure by Letters Patent is:

1. In an automatic phonograph having a turntable for carrying a record during the playing thereof, means for releasably supporting a stack of records above said turntable comprising slicer members on which said stack normally rests, support members located below said slicer members and equipped with fingers which extend laterally out from under said stack for supporting said stack temporarily at times, said slicer members arranged to slide between the lowermost record of a stack and said stack, and means for actuating said slicer members and said support members to cause said slicer members to move out from under said stack and to move said fingers thereunder before complete removal of said slicer members to thereby transfer said stack of records to the fingers for temporary support and to then move said slicer members back into said stack between the lowermost record and the stack and at the same time remove said fingers as a temporary support, whereby a record is released from said stack for deposit on said turntable, said fingers being provided with vertically extending surfaces formed for contact relationship with the periphery of a record for maintaining the same concentric with the turntable.

2. In an automatic phonograph having a mechanism for picking up and supporting a record during the playing thereof, means for releasably supporting a stack of records above said mechanism comprising first rotatable supporting fingers positioned with respect to said stack of records for supporting the same, said first supporting fingers formed with edges to be inserted between the lowermost record of a stack and the stack, second rotatable record supporting fingers located below said first supporting fingers but normally out from under said stack, third record supporting fingers positioned underneath and in vertical alignment with said first supporting fingers for carrying a record to be played, said first and second record supporting fingers being spaced apart vertically a distance substantially equal to the thickness of a record, a curved surface interposed between and carried at the innermost radial portions of said second and third fingers for guiding a record along the axis of rotation of said turntable, and means for actuating said fingers to first rotate said first fingers to withdraw their support from said stack and to rotate said second fingers underneath said stack before withdrawal of said first fingers to provide a temporary support for said stack and to then rotate said first fingers back into a position of supporting said stack and to rotate said second fingers so as to remove their temporary support from said stack, during the latter action said first fingers are rotated between the lowermost record of a stack and the stack to thereby separate said lowermost record for deposit on said third fingers where the record is picked up by said mechanism for playing.

3. In an automatic phonograph having a turntable for picking up and carrying a record during the playing thereof, means for releasably supporting a stack of records above said turntable for release thereto one at a time comprising three slicer members each of which is provided with a finger extending under the lowermost record of said stack for supporting the same and rotatable out from under said stack and back into the stack between the lowermost record and said stack, rotatable support members arranged below each of said slicer members and provided with upper and lower fingers, said upper fingers located below said slicer fingers but angularly displaced therefrom so as to be out from under said stack when said slicer fingers are thereunder, said slicer fingers and said upper fingers being spaced apart vertically a distance substantially equal to the thickness of a record, said lower fingers arranged below said slicer fingers for carrying a record to be picked up by said turntable, curved surfaces carried at the innermost radial portions of said slicer members and their associated upper fingers for guiding a record along the axis of rotation of said turntable, and means for rotating said slicer fingers out from under said stack and said upper fingers thereunder before complete removal of said slicer fingers to thereby transfer said stack of records to said upper fingers for temporary support and to then rotate said slicer fingers back into said stack between the lowermost record and the stack, whereby a record is released from said stack for deposit on said lower fingers where said record will be picked up by said turntable.

4. In an automatic phonograph having a turntable for picking up and carrying a record during the playing thereof, means for releasably supporting a stack of records above said turntable for release thereto one at a time comprising three slicer members each of which is provided with a finger extending under the lowermost record of said stack for supporting the same and rotatable out from under said stack and then back into said stack between the lowermost record and said stack, rotatable support members arranged below each of said slicer members and provided with upper and lower fingers, said upper fingers located below said slicer fingers but angularly displaced therefrom so as to be out from under said stack when said slicer fingers are thereunder, said slicer fingers and upper fingers being spaced apart vertically a distance substantially equal to the thickness of a record, said lower fingers arranged below said slicer fingers for carrying a record to be picked up by said turntable, said slicer and support members being constructed and arranged to compensate for variance in record thicknesses, curved surfaces carried at the innermost radial portions of said slicer members and their associated upper fingers for guiding a record along the axis of rotation of said turntable, and means for rotating said members and also said fingers so that said slicer fingers rotate out from under said stack and said upper fingers rotate thereunder before said slicer fingers are completely removed to thereby transfer said stack of records to said upper fingers for temporary support and to then rotate said slicer fingers back into said stack between the lowermost record and the stack, whereby a record is released from said stack for deposit on said lower fingers where said record will be picked up by said turntable.

5. In an automatic phonograph having a turntable for picking up and carrying a record during the playing thereof, means for releasably supporting a stack of records above said turntable for release thereto one at a time comprising slicer members each of which is provided with a finger extending under the lowermost record of said stack for supporting the same and rotatable out from under said stack and then back into said stack between the lowermost record and said stack, rotatable support members arranged below each of said slicer members and provided with upper and lower fingers, said upper fingers located below said slicer fingers but angularly displaced therefrom so as to be out from under said stack when said slicer fingers are thereunder, said slicer fingers and upper fingers being spaced apart vertically a distance substantially equal to the thickness of a record, said lower fingers arranged below said slicer fingers for carrying a record to be picked up by said turntable, said slicer and support members being relatively movable a limited amount and provided with mating cam surfaces constructed and arranged to compensate for variance in record thicknesses, curved surfaces carried at the innermost radial portions of said slicer members and their associated upper fingers for guiding a record along the axis of rotation of said turntable, and means for rotating said members and said fingers so that said slicer fingers rotate out from under said stack and said upper fingers rotate thereunder before said slicer fingers are entirely removed to thereby transfer said stack of records to said upper fingers for temporary support and to then rotate said slicer fingers back into said stack between the lowermost record and the stack, whereby a record is released from said stack for deposit on said lower fingers where said record will be picked up by said turntable.

6. In an automatic phonograph having a turntable for picking up and carrying a record during the playing thereof, means for releasably supporting a stack of records above said turntable for releasing thereto one at a time comprising slicer members each of which is provided with a finger extending under the lowermost record of said stack for supporting the same and rotatable out from under said stack and back into the stack between the lowermost record and said stack, support members arranged below each of said slicer members and provided with upper and lower fingers, said upper fingers being located below said slicer fingers a distance substantially equal to the thickness of a record and angularly displaced from said slicer fingers so as to be out from under said stack when the latter fingers are thereunder, said lower fingers arranged below said slicer fingers for receiving a record to be picked up by said turntable, means interposed between said slicer members and said support members for compensating for variance in record thicknesses, said slicer members being contoured to provide guiding and centering surfaces for maintaining the record concentric with said turntable and means for rotating said members to cause said slicer fingers to rotate out from under said stack and to rotate said upper fingers thereunder before complete removal of said slicer fingers to thereby transfer said stack of records to said upper fingers for temporary support and to then rotate said slicer fingers back into said stack between the lowermost record and the stack, whereby a record is released from said stack for deposit on said lower fingers to be picked up by said turntable.

7. In an automatic phonograph having a turntable for carrying a record during the playing thereof, means for releasably supporting a stack of records above said turntable comprising revolvable elements spaced apart circumferentially around the turntable, each of said elements being equipped with a first supporting finger constituted to be normally positioned with respect to said stack of records for supporting the same and having an edge formed to slide between the lowermost record of a stack and the stack, a second supporting finger constituted to be rotated in a plane below said first supporting finger but normally out from under said stack, said elements having vertically extending sides positioned at their innermost radial portions and contoured to provide guiding surfaces for the records to maintain the same in a central position with respect to the turntable, and means for revolving said elements to cause said first finger to move out from under said stack and to move said second finger thereunder before complete removal of said first finger to thereby transfer said stack of records to said second finger for temporary support and to then move said first finger back into said stack between the lowermost record and the stack and at the same time remove said second finger as a temporary support, whereby a record is released from said stack for deposit on said turntable.

References Cited in the file of this patent

UNITED STATES PATENTS

| Number | Name | Date |
|---|---|---|
| 1,390,404 | Wahlberg | Sept. 13, 1921 |
| 1,841,593 | Benjamin | Jan. 19, 1932 |
| 2,307,031 | Erwood | Jan. 5, 1943 |
| 2,378,086 | Johnson | June 12, 1945 |
| 2,397,932 | Erwood | Apr. 9, 1946 |

FOREIGN PATENTS

| Number | Country | Date |
|---|---|---|
| 179,748 | Great Britain | May 18, 1922 |
| 407,952 | Great Britain | Mar. 20, 1934 |
| 106,995 | Sweden | Mar. 30, 1943 |